Patented Aug. 27, 1946

2,406,633

UNITED STATES PATENT OFFICE 2,406,633

ISOMERIZATION OF SATURATED HYDROCARBONS

Herman Pines and Richard C. Wackher, Riverside, Ill., assignors to Universal Oil Products Company, Chicago, Ill., a corporation of Delaware No Drawing. Application November 19, 1943, Serial No. 510,912

12 Claims. (Cl. 260—683.5)

This invention relates to the catalytic isomerization of isomerizable saturated hydrocarbons and is more specifically concerned with an improved process wherein these hydrocarbons are isomerized under carefully selected conditions of operation in the presence of certain aromatic ethers.

The isomerization of saturated hydrocarbons has assumed considerable importance at the present time, particularly the isomerization of normally liquid paraffinic hydrocarbons such as pentane, hexanes, heptanes, etc., which upon isomerization produce compounds which have very desirable antiknock properties when included in aviation gasoline blends and other motor fuels. Moreover, these isomerized products, especially the isomers having at least one tertiary carbon atom per molecule, may be alkylated with an alkylating agent such as an olefin, alcohol, etc., to produce higher molecular weight alkyl derivatives which have very desirable antiknock qualities and which are useful intermediates in organic synthesis.

It is well known that saturated hydrocarbons may be isomerized using catalysts of the Friedel-Crafts type such as aluminum halides, zinc halides, zirconium halides, or mixtures thereof in the presence of a hydrogen halide. The primary operating difficulty accompanying these isomerization operations is the tendency toward high catalyst consumption due to the formation of metal halide-hydrocarbon complexes. The catalyst complexes or sludges are formed by the interaction of the metal halide with the products of decomposition reactions which occur simultaneously with the isomerization reaction.

Various methods have been proposed to prevent the decomposition of the saturated hydrocarbons thereby preventing high catalyst consumptions. For example, it has been proposed to introduce hydrogen into the reaction zone to suppress decomposition and presumably to hydrogenate unsaturated hydrocarbon fragments formed by decomposition of the charging stock. The use of hydrogen as a decomposition suppressor has been found to be very expensive and entails the use of a considerable amount of auxiliary equipment such as compressors, separators, etc., to provide a means for recycling the hydrogen to the reaction zone.

It is an object of the present invention to provide a method for suppressing the decomposition of the isomerizable hydrocarbons which is economical and practical and which obviates the difficulties which are inherent in the use of hydrogen.

Broadly, the invention comprises a process for isomerizing a saturated hydrocarbon by contacting said hydrocarbon with an isomerizing catalyst under isomerization conditions in the presence of a relatively minor amount of a diaryl, alkylaryl, or cycloalkylaryl ether.

In one specific embodiment the present invention comprises a process for the production of isopentane by contacting normal pentane containing a relatively minor amount of a diaryl, alkylaryl, or cycloalkylaryl ether with an aluminum chloride-hydrogen chloride catalyst under isomerizing conditions.

We have discovered that the addition of these aromatic ethers selectively suppresses the decomposition reactions and permits the isomerization of the saturated hydrocarbons with a high degree of efficiency and low catalyst consumption. The exact mechanism by which these aromatic ethers suppress decomposition reactions is not thoroughly understood, but it will be evident from the experimental data hereinafter presented that greatly improved results are obtained when the aromatic ethers are present.

The aromatic ethers which may be employed to suppress decomposition reactions during the isomerization of saturated hydrocarbons comprise broadly the ethers having the following formula:

$$R\text{—}O\text{—}R'$$

where R is an aryl group and R' is an alkyl, cycloalkyl, or aryl group. It will thus be seen that the aromatic ethers which are within the scope of our invention fall into three groups, namely, the diaryl ethers, the alkylaryl ethers, and the cycloalkylaryl ethers. Typical diaryl ethers which may be employed are diphenyl ether and the alkylated diphenyl ethers such as methyltolyl ether. Typical examples of the alkylaryl ethers which may be used in our invention are methylphenyl ether or anisole, ethylphenyl ether or phenetole, propylphenyl ether, butylphenyl ether, etc. Cyclopentylphenyl ether and cyclohexylphenyl ether are illustrative of the cycloalkylaryl ethers.

These various ethers are not necessarily equivalent in their effectiveness since obviously different amounts of aromatic ether may be required dependent upon the nature of the catalyst and charging stock and also upon the operating conditions employed. The concentration of the aromatic ether in the isomerization charging stock is generally from about 0.1% to about 5% by weight. The use of the above mentioned aromatic ethers to suppress decomposition reactions is particularly applicable to the isomerization of normal pentane since normal pentane exhibits an unusual tendency to undergo decomposition when subjected to isomerizing conditions. The various aromatic ethers are separated from the isomerization reaction products by fractionation or other suitable means and may be recycled to the isomerization step.

The operating conditions of the isomerization process such as temperature and pressure will vary somewhat depending upon the aromatic ether and catalyst employed. Ordinarily, temperatures within the range of about 50° F. to about 350° F. and more preferably within the range of from about 120° F. to about 250° F. and pressures varying from substantially atmospheric to about 500 pounds per square inch or more are desirable.

Any of the well-known Friedel-Crafts type isomerization catalysts may be employed. It is desirable that a hydrogen halide such as hydrogen chloride and hydrogen bromide be used in conjunction with these catalytic materials. The ordinary concentration of the hydrogen halide is within the range of about 1 to about 40 mol per cent of the charge and preferably from about 5 to about 20 mol per cent. The preferred catalysts comprise the chlorides and bromides of aluminum, zinc, zirconium, and iron, either alone or in admixture with one another. These catalysts may be employed in the solid granular state or upon inert supporting materials such as alumina, silica, thoria, crushed firebrick, quartz, activated clays, and activated chars.

It is also within the scope of this invention to employ mixtures of these compounds and in particular the aluminum halides with the halides of antimony, bismuth, and arsenic, to form catalyst composites which are molten under the conditions of operation.

The isomerization operation may be conducted in various ways. For example, the heated hydrocarbon charge containing the added aromatic ether may be passed either in the liquid, vapor, or mixed phase through a reaction zone containing a bed of solid granular catalyst either supported or unsupported, and the reaction products may be separated into the desired isomers and unconverted material the latter being recycled to the reaction zone.

Another method of operation consists of employing a catalyst supply chamber containing a bed of granular catalyst through which a stream of the charge is passed in liquid phase to dissolve the required amount of catalyst. This catalyst-containing stream is introduced into a reaction zone along with a regulated amount of the hydrogen halide, and a substantial portion of the hydrocarbon is isomerized therein. This reaction zone may comprise a large vessel which will provide sufficient time for the reaction to occur or may be filled with a retaining material such as molten salts, hydrocarbon-metal halide complexes, or solid packing materials such as bauxite, Raschig rings, berl saddles, granular quartz and other materials well known to those skilled in the art.

The following examples illustrate in a general way the effectiveness of the aromatic ethers disclosed herein in suppressing decomposition reactions during the isomerization operation. It is not intended that these examples unduly limit the generally broad scope of this invention.

A series of experiments was conducted to investigate the effect of methylphenyl ether and diphenyl ether in the normal pentane isomerization reaction. An electrically heated autoclave equipped with a mechanical stirrer was charged with 85 grams of normal pentane and the designated amount of aromatic ether, and anhydrous aluminum chloride and hydrogen chloride were added. The autoclave was sealed and the reaction was carried out for a period of six hours. A blank run was also made without the addition of an aromatic ether to suppress decomposition reactions. The pertinent data from these tests are tabulated as follows:

|  | Run No. | | |
| --- | --- | --- | --- |
|  | 1 | 2 | 3 |
| Charge, grams: | | | |
| Aluminum chloride | | 15 | |
| Hydrogen chloride | 2.8 | 2.7 | 3.0 |
| n-Pentane | | 85 | |
| Methylphenyl ether | 0 | 2.0 | 0 |
| Diphenyl ether | 0 | 0 | 2.1 |
| Temperature, °C | | 75 | |
| Maximum pressure, p. s. i. gage | 110 | 73 | 65 |
| Time, hours | | 6 | |
| Analysis of product, mol per cent: | | | |
| i-Butane | 54.1 | [1] 10.1 | |
| n-Butane | 8.1 | 0.5 | 1.4 |
| i-Pentane | 19.2 | 54.9 | 53.6 |
| n-Pentane | 11.8 | 30.3 | 44.3 |
| Hexane and higher | 6.8 | 4.2 | 0.7 |

[1] Also includes 0.1% HCl.

In run 1, which was the blank run, it will be noted that although 19.2% isopentane was obtained there was also a total butane production of 62.2% which represents a relatively low efficiency of conversion to isopentane. In run 2 employing methylphenyl ether, 54.9% isopentane was obtained with only 10.5% of butane thus indicating the marked effect of methylphenyl ether or anisole in suppressing decomposition reactions. It will also be noted in run 2 that 30.3% of unconverted normal pentane was recovered. At somewhat more severe operating conditions higher conversions to isopentane would undoubtedly be obtained.

In run 3 diphenyl ether was employed to suppress decomposition. Comparing the results of this test with the results obtained in run 1 it will be noted that the presence of the aromatic ether suppressed the butane production to a very marked extent and resulted in a high yield of isopentane.

We claim as our invention:

1. An isomerization process which comprises contacting a paraffin hydrocarbon under isomerizing conditions with a metal halide isomerizing catalyst of the Friedel-Crafts type in the presence of a relatively minor amount of an ether having the formula R—O—R' wherein R is an aryl group and R' is a hydrocarbon radical selected from the class consisting of alkyl, cycloalkyl, and aryl groups.

2. An isomerization process which comprises contacting a normally liquid paraffin hydrocarbon and an ether having the formula R—O—R' wherein R is an aryl group and R' is a hydrocarbon radical selected from the class consisting of alkyl, cycloalkyl, and aryl groups with a Friedel-Crafts type isomerizing catalyst under isomerizing conditions.

3. An isomerization process which comprises contacting a normally liquid paraffin hydrocarbon and an ether having the formula R—O—R' wherein R is an aryl group and R' is a hydrocarbon radical selected from the class consisting of alkyl, cycloalkyl, and aryl groups with a metal halide of the Friedel-Crafts type and a hydrogen halide under isomerizing conditions.

4. An isomerization process which comprises contacting a normally liquid paraffin and an ether having the formula R—O—R' wherein R is an aryl group and R' is a hydrocarbon radical selected from the class consisting of alkyl, cycloalkyl, and aryl groups with an aluminum chloride catalyst and hydrogen chloride under isomerizing conditions.

5. The process of claim 1 wherein said ether comprises methylphenyl ether.

6. The process of claim 1 wherein said ether comprises diphenyl ether.

7. The process of claim 1 wherein said ether comprises cyclohexylphenyl ether.

8. An isomerization process which comprises contacting normal pentane containing a relatively minor amount of an ether having the formula R—O—R' wherein R is an aryl group and R' is a hydrocarbon radical selected from the class consisting of alkyl, cycloalkyl, and aryl groups with a metal halide isomerizing catalyst of the Friedel-Crafts type under isomerizing conditions.

9. An isomerization process which comprises contacting normal pentane containing a relatively minor amount of an ether having the formula R—O—R' wherein R is an aryl group and R' is a hydrocarbon radical selected from the class consisting of alkyl, cycloalkyl, and aryl groups with an aluminum chloride catalyst and hydrogen chloride under isomerizing conditions.

10. The process of claim 9 wherein said ether comprises methylphenyl ether.

11. The process of claim 9 wherein said ether comprises diphenyl ether.

12. The process of claim 9 wherein said ether comprises cyclohexyphenyl ether.

HERMAN PINES.
RICHARD C. WACKHER.